(12) United States Patent
Hugener-Campbell et al.

(10) Patent No.: US 8,309,484 B2
(45) Date of Patent: Nov. 13, 2012

(54) PREPARATION AND MANUFACTURE OF AN OVERLAYER FOR DEACTIVATION RESISTANT PHOTOCATALYSTS

(75) Inventors: Treese Hugener-Campbell, Coventry, CT (US); Thomas Henry Vanderspurt, Glastonbury, CT (US); David F. Ollis, Chapel Hill, NC (US); Stephen O. Hay, Tolland, CT (US); Timothy N. Obee, South Windsor, CT (US); Wayde R. Schmidt, Pomfret Center, CT (US); Michael A. Kryzman, West Hartford, CT (US)

(73) Assignee: Carrier Corporation, Farmington, CT (US)

( * ) Notice: Subject to any disclaimer, the term of this patent is extended or adjusted under 35 U.S.C. 154(b) by 38 days.

(21) Appl. No.: 12/302,603

(22) PCT Filed: May 31, 2007

(86) PCT No.: PCT/US2007/012813
§ 371 (c)(1),
(2), (4) Date: Nov. 26, 2008

(87) PCT Pub. No.: WO2007/143013
PCT Pub. Date: Dec. 13, 2007

(65) Prior Publication Data
US 2009/0185966 A1  Jul. 23, 2009

Related U.S. Application Data

(60) Provisional application No. 60/809,995, filed on Jun. 1, 2006, provisional application No. 60/810,022, filed on Jun. 1, 2006, provisional application No. 60/810,023, filed on Jun. 1, 2006.

(51) Int. Cl.
| | | |
|---|---|---|
| *B01J 21/00* | (2006.01) | |
| *B01J 23/00* | (2006.01) | |
| *B01J 25/00* | (2006.01) | |
| *B01J 29/00* | (2006.01) | |
| *B01D 53/22* | (2006.01) | |
| *B01D 59/12* | (2006.01) | |
| *B32B 3/00* | (2006.01) | |
| *B32B 3/26* | (2006.01) | |

(52) U.S. Cl. ........ 502/100; 502/232; 502/242; 502/350; 96/11; 428/316.6

(58) Field of Classification Search .................. 502/4, 5, 502/242, 300, 350, 100, 232; 427/453, 454; 423/245.1; 422/186; 96/11; 55/523–524; 428/310.5, 316.6, 446, 702
See application file for complete search history.

(56) References Cited

U.S. PATENT DOCUMENTS 5,668,076 A * 9/1997 Yamagushi et al. .......... 502/343
(Continued)

FOREIGN PATENT DOCUMENTS

JP    2002085967 A * 3/2002
(Continued)

OTHER PUBLICATIONS

Ohno et al. "Morhpology of a Tio2 Photocatalyst (Degussa, P-25) Consisting of Anatase and Rutile Crystalline Phases", Journal of Catalysis 203, 82-86 (2001).*
(Continued)

*Primary Examiner* — Stanley Silverman
*Assistant Examiner* — Anthony J Zimmer
(74) *Attorney, Agent, or Firm* — Cantor Colburn LLP

(57) ABSTRACT

A photocatalyst system for volatile organic compounds with two parts that include a photocatalyst layer on a substrate and a porous overlayer. The photocatalyst layer is reactive with volatile organic compounds when UV light is projected on it. The overlayer is situated on the photocatalyst layer. The overlayer is UV transparent and has an interconnected pore network that allows contaminated air to pass through the overlayer. The size and the shape of the interconnected pores acts to selectively exclude certain contaminants that can deactivate the photocatalyst.

11 Claims, 3 Drawing Sheets

U.S. PATENT DOCUMENTS

| | | | |
|---|---|---|---|
| 5,933,702 A | 8/1999 | Goswami | |
| 6,136,203 A | 10/2000 | Butters et al. | |
| 6,156,211 A * | 12/2000 | Gonzalez-Martin et al. | 204/157.9 |
| 6,238,631 B1 * | 5/2001 | Ogata et al. | 422/186.3 |
| 6,241,856 B1 | 6/2001 | Newman et al. | |
| 6,531,100 B1 * | 3/2003 | Ogata et al. | 422/177 |
| 6,890,373 B2 * | 5/2005 | Nemoto et al. | 95/90 |
| 6,908,698 B2 * | 6/2005 | Yoshida et al. | 428/697 |
| 2002/0005145 A1 | 1/2002 | Sherman | |
| 2002/0050450 A1 | 5/2002 | Newman et al. | |
| 2003/0113246 A1 | 6/2003 | Satou et al. | |
| 2004/0202723 A1 | 10/2004 | Yu et al. | |
| 2005/0129589 A1 * | 6/2005 | Wei et al. | 422/177 |
| 2005/0129591 A1 * | 6/2005 | Wei et al. | 422/186 |
| 2005/0233899 A1 * | 10/2005 | Anzaki et al. | 502/350 |
| 2007/0042906 A1 * | 2/2007 | Pitts et al. | 502/350 |

FOREIGN PATENT DOCUMENTS

| | | |
|---|---|---|
| WO | 2004112958 A1 | 12/2004 |
| WO | 2006065491 A2 | 6/2006 |

OTHER PUBLICATIONS

Masatoshi Nakamura., "Hydrophilic and photocatalytic properties of the SiO2/TiO2 double layers", Thin Solid Films 496 (2006) 131-135. Published Online: Oct. 3, 2005.*

Official Search Report of the Patent Cooperation Treaty in counterpart foreign Application No. PCT/US07/12813. filed May 31, 2007.

Extended EP Search Report of the European Patent Office in counterpart foreign Application No. 07809257.4 dated Apr. 25, 2012, 6 pages.

* cited by examiner

US 8,309,484 B2

PREPARATION AND MANUFACTURE OF AN OVERLAYER FOR DEACTIVATION RESISTANT PHOTOCATALYSTS

CROSS-REFERENCE TO RELATED APPLICATION(S)

This application claims the benefit of PCT Application No. PCT/US2007/012813 filed May 31, 2007 entitled PREPARATION AND MANUFACTURE OF AN OVERLAYER FOR DEACTIVATION RESISTANT PHOTOCATALYSTS, which claims the benefit of US Provisional Application No. 60/809,995, filed Jun. 1, 2006 entitled FILTER DEVICES HAVING DEACTIVATION RESISTANT PHOTOCATALYSTS and US Provisional Application No. 60/810,022, filed Jun. 1, 2006 entitled SILICON MITIGATION OR REMOVAL SYSTEM and US Provisional Application No. 60/810,023, filed Jun. 1, 2006 entitled PREPARATION AND MANUFACTURE OF A UV TRANSPARENT POROUS OVERLAYER FOR DEACTIVATION RESISTANT PHOTOCATALYST.

BACKGROUND OF THE INVENTION

1. Field of the Invention

This disclosure relates generally to photocatalysts and, more particularly, to a method and system for decreasing deactivation in photocatalysts.

2. Description of the Related Art

Ultraviolet (UV) Photocatalytic Oxidation may be used for fluid purification, in particular, indoor air purification. Generally, the irradiation from UV lamps is projected onto a photocatalyst coated substrate in order to purify air by UV Photocatalytic Oxidation. The substrate may be any surface, such as, a flat plate, mesh, or honeycomb. The photocatalyst may be, for example, titanium dioxide ($TiO_2$), which is a common white pigment used in paint that is readily available and economical. UV light is projected on the catalyst promoting the formation of reactive species on the catalyst surface. The reactive species interact with volatile organic compounds in air passing over and absorbing onto the surface of the catalyst to transform the volatile organic compounds into byproducts such as carbon dioxide ($CO_2$) and water.

Volatile organic compounds (VOCs) are known to be any organic compounds that participate in atmospheric photochemical reactions. The aggregate amount of VOCs in air is typically on the order of 1 part per million by volume. Volatile silicon-containing compound (VSCCs) concentrations are also typically present in air, but are typically two or more orders of magnitude lower. VOCs can originate from many sources, such as industrial emissions, building materials, transportation exhaust, paints, cleaning chemicals and building materials. VSCCs arise primarily from the use of certain personal care products, such as deodorants, shampoos and the like, or dry cleaning fluids, and from the use of RTV silicone caulks, adhesives, lubricants and the like. Where VOCs are constructed of carbon-based molecules such as aldehydes, ketones, or hydrocarbon functionalities, VSCCs are typically comprised of silicon oxygen backbone chains that incorporate hydrocarbon pendant groups along the silicon oxygen backbone.

Over the last decade, levels of VSCCs, including siloxanes, in the air have been increasing. Siloxanes are included in health, beauty and personal care products, such as, deodorant, skin cream, hair spray, etc. UV Photocatalytic Oxidation is effective in transforming siloxanes into harmless by-products. Unfortunately, the prior art photocatalysts may become ineffective in a short amount of time, due to conversion of silicon containing compounds to various forms of silica at the surface of the photocatalyst, which block the catalyst active sites.

SUMMARY OF THE INVENTION

The present disclosure provides a method and apparatus for decreasing deactivation and increasing the lifetime of a catalyst in a photocatalyst system.

A photocatalyst system for decomposing contaminants in a fluid is described. Specifically, a two-part photocatalyst system for decomposing VOCs and VSCCs contained in a fluid. The fluid has a first, minor portion of VSCCs, and a second, major portion of VOCs.

The photocatalyst is constructed of two parts, where a first part is a photocatalyst layer primarily constructed to decompose VOCs and a second part is an overlayer primarily constructed to decompose VSCCs. The photocatalyst system includes a photocatalyst layer on a substrate. The photocatalyst layer is reactive with the VOCs when UV light is projected thereon. An overlayer is on the photocatalyst layer. The overlayer is UV transparent, and has an interconnected pore network that allows a large portion of the fluid mixture to pass through but retards a small VSCC laden portion of the fluid from passing through.

A method of making a photocatalyst system for VOCs having a first part and a second part is also provided. The method includes applying a layer of a photocatalyst to a substrate where the photocatalyst is configured to create reactive products to the volatile organic compounds and applying the above-described overlayer on the photocatalyst.

The overlayer may have a high surface area that is formed by a plurality of nanoparticulate agglomerates. The plurality of nanoparticulate agglomerates may form a plurality of protrusions on a outer surface of the overlayer presented to the fluid, that is opposite the inner surface of the overlayer that is adjacent the photocatalyst layer. The interconnected pore network may be formed by a plurality of nanoparticulate agglomerates, and the plurality of nanoparticulate agglomerates may connect to one another, forming spaces in between the agglomerates.

The interconnected pore network represents a fractal structure where the arrangement of local particles creates small pores in a local environment. Larger pores result from the long scale arrangement of the local network. A plurality of different sized pores that range between about 3 nanometers and about 200 nanometers results. More specifically, the interconnected pore network may have a first plurality of pores, greater than about 3 nanometers, that connect with a second plurality of pores, greater than about 6 nanometers, that connect with a third plurality of pores, greater than about 12 nanometers, that connect with a fourth plurality of pores, greater than about 100 nanometers, that connect with a fifth plurality of pores less than about 200 nanometers.

The overlayer may absorb or backscatter less than about 25% of incident light. The overlayer may include amorphous, crystalline, or partially crystalline forms of silica ($SiO_2$). The silica may exist as discrete particles, agglomerates, or mixtures thereof. The interconnected pore network of the overlayer may have pores that are sized smaller than VSCCs. At least a portion of the photocatalyst layer may retain a portion of VSCCs contained in a fluid mixture, while the remaining fluid volume may pass through.

The application of the overlayer may include spraying an aqueous suspension of a particulate compound onto a photocatalyst supported on suitable substrate. The overlayer may be prepared by mixing or dispersing solid silica in water, aqueous or an organic liquid. The application of the overlayer may include applying a plurality of nanoparticulate agglomerates, and the plurality of nanoparticulate agglomerates may connect to one another, forming spaces between the agglomerates to form the interconnected pore network. The photocatalyst may be titanium dioxide ($TiO_2$). The substrate may be in an ultraviolet photocatalytic oxidation filter.

The above-described and other features and advantages of the present disclosure will be appreciated and understood by those skilled in the art from the following detailed description, drawings, and appended claims.

DETAILED DESCRIPTION OF THE INVENTION

It has been determined by the present disclosure that the longevity of a photocatalyst can be increased against VSCCs by a protective overlayer. Without wishing to be bound by any particular theory, it is believed that by incorporating an overlayer with a high surface area, a suitably low mass transfer resistance pore structure prevents VSCCs from contacting a surface of the photocatalyst as easily as without the overlayer. Advantageously, it has been determined that pores in the overlayer form a tortuous path, such that smaller VOCs (such as, for example, formaldehyde, acetaldehyde, heptanal, ethanol, isopropanol, toluene, and xylenes) are allowed to reach the catalytic surface more rapidly than larger compounds such as VSCCs, that are relatively much larger and heavier.

Further, VSCCs and other volatile silicon compound deactivating agents may land on the surface of the overlayer and reside there for a period of time before adhering to the outer surface of the overlayer or migrating onto another surface. This allows active oxygen species, such as hydroxyl radicals or hydrogen peroxide, which originate at the catalyst surface to oxidize the VSCCs before they adsorb on the catalyst, where oxidation would result in deactivation. If oxidized while in contact with the overlayer, the deactivating layer would form on the overlayer, and not the catalyst. VSCCs are unable to traverse the overlayer, or take a longer time to travel through the overlayer than smaller molecules, thereby protecting the photocatalyst. As a result, the lifetime of the photocatalyst is increased.

Figure 1:
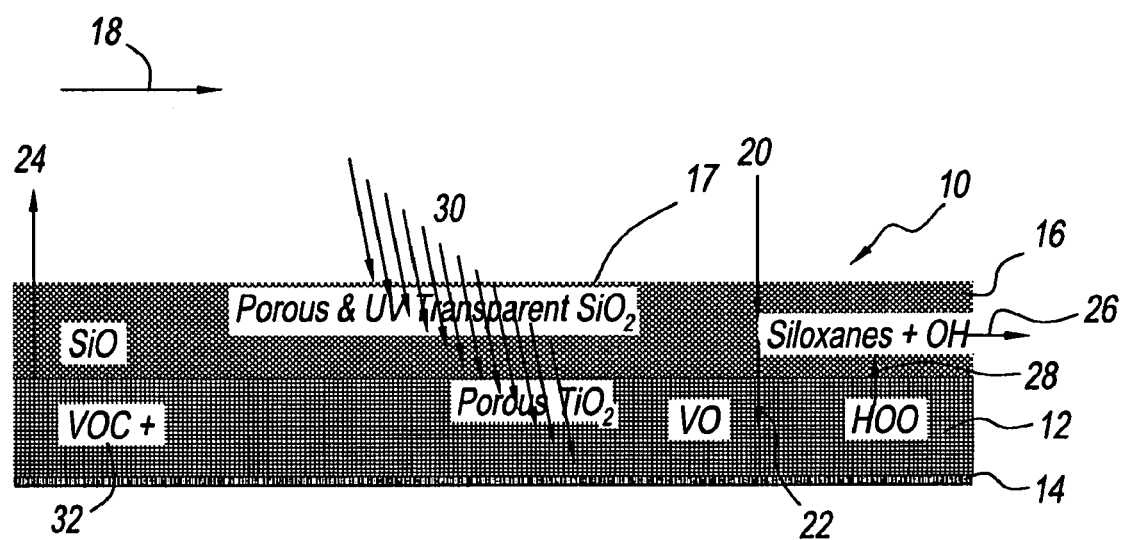
FIG. 1 is a schematic of an exemplary embodiment of a photocatalyst system according to the present disclosure.

A first exemplary embodiment of a photocatalyst system 10 is shown in FIG. 1. A photocatalyst layer 12 is on a substrate 14. The substrate 14 may be any surface a photocatalyst may bond to, such as, for example, a flat surface, mesh or honeycomb. The substrate may be aluminum, other metals or alloys, ceramic, glass, fiberglass, quartz, clear polymers such as polymethylmethacrylate (PMMA) or polycarbonate (PC), carbon or activated carbon, zeolites, or any other material that supports the catalyst in an open, low pressure drop arrangement. Polymer based substrates would be selected based on their inherent resistance to UV degradation.

The photocatalyst layer 12 may be a semiconductor, in which a photon (light) of the proper energy (wavelength) can promote an electron into the conduction band of the photocatalyst. This creates electron/hole pairs, which can react with adsorbed molecular oxygen and water to create active oxygen species, such as the hydroxyl radical. These species in turn react with adsorbed VOCs and SVOCs, oxidizing them. For example, the photocatalyst layer can be titanium oxide ($TiO_2$), tin oxide ($SnO_2$), indium oxide ($In_2O_3$), zinc oxide, (ZnO), tungsten oxide ($WO_3$), and any combinations thereof. The photocatalyst layer 12 may be formed of an optically dense (6 to 10 microns for titanium dioxide) coating of the photocatalytic material. The photocatalytic material may be a single compound or a mixture of compounds.

System 10 also includes an overlayer 16 on an outer surface of photocatalyst layer 12 that is opposite the substrate 14. The overlayer 16 has a high surface area, which is a non-flat surface. A surface that is non-flat has a greater surface area than a flat surface, due to depressions or protrusions thereon. The overlayer 16 has a high surface area that is greater than an overlayer having an upper surface 17 that is flat opposite the photocatalyst layer 12. For example, the upper surface of overlayer 16 may be formed by a plurality of nanoparticulate agglomerates, having protrusions extending outward therefrom. The protrusions increase the surface area of the overlayer 16 in comparison to a flat surface, giving overlayer 16 a high surface area. The plurality of nanoparticulate agglomerates may be micron-sized. The high surface area may be formed of any non-flat geometry.

The overlayer 16 has a low mass transfer resistance pore structure. The pore structure with low mass transfer resistance can be defined as an interconnected pore network. The interconnected pore network may be in a random or fractal distribution having both small and large pores. The interconnected pore network may be formed by depositing a plurality of nanoparticulate agglomerates (that may be micron sized), on top of one another. The plurality of nanoparticulate agglomerates may connect to one another, forming spaces or pores therebetween.

The interconnected pore network may be in a fractal distribution, and have pores ranging in size from about 3 nanometers to about 200 nanometers. In one embodiment, the interconnected pore network may include a first plurality of pores that are greater than about 3 nanometers, that connect to a second plurality of pores that are greater than about 6 nanometers, that connect with a third plurality of pores that are greater than about 12 nanometers, that connect to a fourth plurality of pores greater than about 100 nanometers, that connect to a fifth plurality of pores having a size up to about 200 nanometers. The pore structure with low mass transfer resistance absorbs or backscatters, such as, for example, less than about 25% of the incident light directed to the photocatalyst surface.

The overlayer 16 is UV transparent or transparent to the wavelength of light activating the photocatalyst. This wavelength may be characterized as UVC, UVB, UVA or visible light. The overlayer 16 may be fumed silica to allow UV light therethrough. One example of a suitable fumed silica for the overlayer is silicon dioxide, $SiO_2$, such as Alfa Aesar silicon dioxide, (amorphous fumed silica) having a surface area of approximately 350 to 420 meters squared per gram ($m^2/g$). The overlayer may be any UV transparent, spherical or ruggedized spherical structure that creates a porous structure, where the majority of particles or agglomerates are less than 40 nm in diameter. The photocatalyst system 10 may be exposed to UV light, such as, for example, UVA, UVB, and/or UVC light, as shown by arrows 30.

In use, ambient air 18 is passed over overlayer 16. The ambient air 18 includes oxygen ($O_2$), nitrogen ($N_2$), and a mixture of VOCs. The VOC mixture includes a first portion that includes VSCCs, in particular, siloxanes. As previously described, the first portion would normally deactivate the photocatalyst layer 12. The VOC mixture includes a second fraction that includes non-silicon containing VOCS. The second portion does not typically deactivate the photocatalyst layer 12. UV light causes photocatalyst layer 12 to create volatile organic compound reactive species 32 (VOC+) in photocatalyst layer 12. Thus, the VOC+ 32 are covered by overlayer 16.

Ambient air 18 having the first portion and the second portion of the VOCs continues to pass over system 10. Both the first portion and the second portion of the volatile organic compounds are attracted to the VOC+ 32, as shown by arrow 20. The first portion, which contains VSCCs, is prevented from passing through overlayer 16, or slowed in passing the overlayer, relative to smaller molecules such as VOCs. Overlayer 16 traps VSCCs, at least temporarily, and may allow these molecules to be oxidized remotely by active species created on the photocatalytic surface. These species are created by the interaction of light with the catalyst producing electron hole pairs, which in turn interact with oxygen and water adsorbed on the catalyst surface. These active species may include hydroxyl radicals (OH.), hydrogen peroxide (HOOH), hydrogen peroxide radicals (HOO.), superoxide ion ($O_2^-$) or other active oxygen species. These active oxygen species may oxidize the VSCCs, as shown by arrow 28.

The second portion is allowed to pass through overlayer 16, as shown by arrow 22. The VOCs are oxidized by photocatalyst layer 12 into by-products, which are carbon dioxide and water if the VOC is completely mineralized. These by-products diffuse through overlayer 16, back into the ambient layer, as shown by arrow 24. The first portion of VSCCs are heavier and diffuse slower, for example 150 to 400 grams per mole. The second portion of VOCs are lighter, faster diffusing molecules, for example 38 to 200 grams per mole.

The overlayer 16 may be applied by spraying an aqueous suspension of a protective compound, or any other common coating technique that allows a porous structure to be achieved. One example of a photocatalyst system included preparing a photocatalyst test slide by dispersing 3 or 0.8 wt % of the composition of $SiO_2$, such as Alfa Aesar® amorphous fumed silica, having a surface area of approximately 350 to 420 meters squared per gram ($m^2/g$), in water, mixing for approximately 30 seconds in a centrifugal mixer at approximately 2500 rotations per minute (rpm), and then spraying a portion onto a photocatalyst, such as, for example, a P25-coated aluminum slide. P25 is a designation of titanium dioxide ($TiO_2$) from the manufacturer Degussa®.

An experimental demonstration of catalyst lifetime extension was conducted. Six identical 1 inch by 3 inch slides were prepared by the method described above for the example of the photocatalyst system. Each slide was coated with a reference photocatalytic material, titanium oxide (Degussa P25.) Three slides, P25 (C2), P25 (C1), and P25 (C7) were set aside as controls. Three additional slides were coated with an overlayer of $SiO_2$. These slides were either coated with 60 milligrams of silica (High (B23) and High (C4)), or 17 milligrams of silica (low (B22)). UVA light was projected on the six slides at 50% relative humidity. The six slides were exposed to ambient air including a siloxane hexamethyldisiloxane (HMDS) and their deactivation was observed as a function of exposure time.

Figure 2:
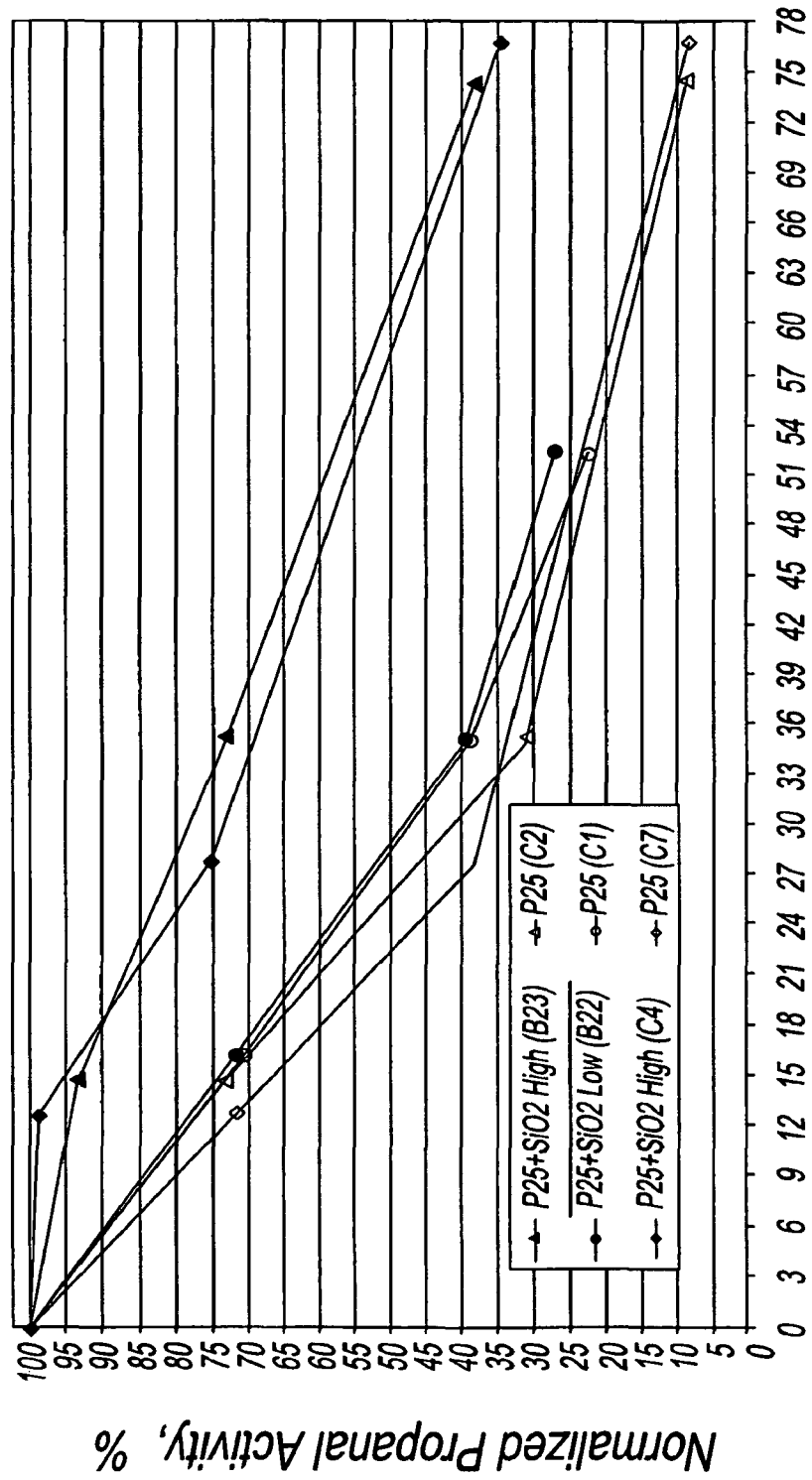
FIG. 2 is a graphical depiction of catalyst deactivation after exposure to hexamethyldisiloxane at 50% relative humidity and ultraviolet A light comparing the system of FIG. 1 to prior art systems.

As shown in FIG. 2, the comparison of the first slide to the fourth slide, the second slide to the fifth slide, and the third slide to the sixth slide, shows that photocatalyst systems including an overlayer of $SiO_2$ have a decrease in a rate of deactivation by 90 parts per billion (ppb) HMDS by a factor of approximately 2.5 that is indicated by normalized propanal activity, shown in percent, over time of exposure to HMDS, shown in hours. Propanal reactivity was used as a measure of the photocatalytic activity. As the photocatalyst deactivates, less propanal is removed by the photocatalytic reaction. Light intensity, humidity and propanal concentration were kept constant. As shown by the curves for the first, second, and third slides, the deactivation is generally an exponential trend. UVC radiation, a known germicidal source, may multiply this deactivation effect. The overlayer 16 may cause a change of the rate of deactivation in a range of about 2.5 to about 3.0, resulting in longer activity over time. Thus, it is apparent that the use of an overlayer extended the lifetime of the photocatalyst over an unprotected photocatalyst.

Figure 3:
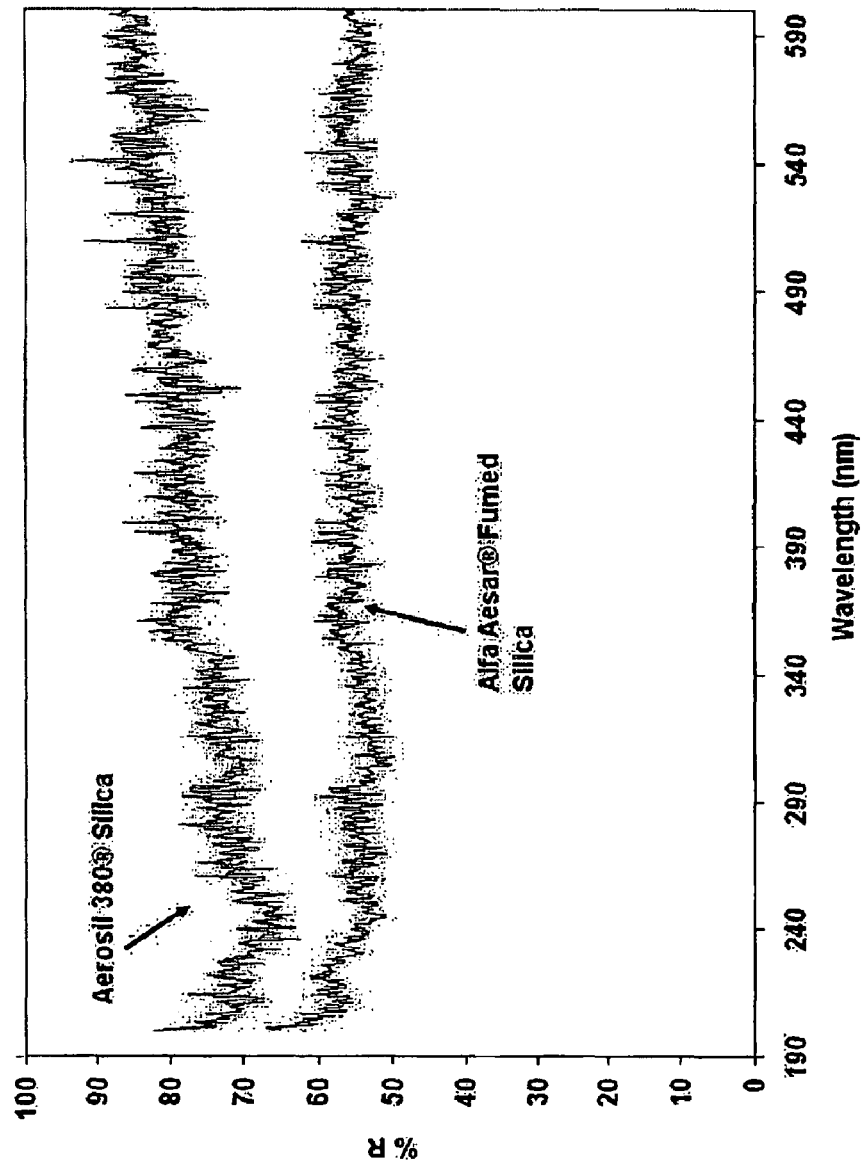
FIG. 3 is a graph of UV-visible reflectance traces for selected silicas that can be used in the photocatalyst system of FIG. 1.

Referring to FIG. 3, UV and visible light reflectance traces are shown for Aerosil 380 silica and Alfa-Aesar silica. Approximately 30 mg of each material was spray coated independently onto quartz slides. While both silica powders have surface areas of approximately 350-400 $m^2/g$, the agglomerate size present in each determines whether UV light will be reflected or absorbed. The preferred mode of light is for light to be absorbed through the silica overlayer to the photocatalyst layer. Aerosil 380® silica powder has a large number of agglomerates greater than 40 nm, which contribute to reflecting the light and hence not all of the light would reach the photocatalyst. In contrast, the typical agglomerate size in the Alfa-Aesar silica is 30 nm, and light permeates through the silica layer to the quartz substrate, which could contain photocatalyst. The Aerosil 380® silica coating on a quartz slide has a higher reflectance value (~greater than 65% R) than the Alfa Aesar fumed silica® coated slide prepared in an identical manner (~less than 60% R). The higher reflectance value correlates to less light reaching the photocatalyst layer (Aerosil 380® silica powder), whereas the lower reflectance value correlates to more light reaching the photocatalyst layer (Alfa-Aesar fumed silica®). Due to the greater the percentage of light penetrating through the Alfa-Aesar fumed silica®, a photocatalyst under a comparable thickness of Alfa-Aesar fumed silica® will afford a higher photocatalytic activity than a silica layer constructed of Aerosil 380® silica.

Other materials transparent to the photocatalyst activating light wavelength may also be incorporated into the overlayer, such as, for example, titanium dioxide if a visible light activated photocatalyst is used. The key concept is that material sufficiently transparent to the wavelengths of the light which activates the photocatalyst must be employed. This allows transmittance and forward scattering of the photons to occur, so that a high percentage of the light reaches the photocatalyst and initiates the photocatalytic chemistry described above.

The overlayer 16 may be continuous or non-continuous. For example, the overlayer 16 may cover one or more portions of the photocatalyst and one or more portions of the photocatalyst may not be covered by the overlayer 16.

The photocatalyst layer 12 may have a second interconnected pore network that is continuous with the interconnected pore network of overlayer 16. This layer may be engineered to be resistant to deactivation. In other words, the photocatalyst may be specifically tailored, with respect to pore structure, crystallite size, crystallinity or other material characteristics to be resistant to deactivation.

The overlayer 16 may be added to a photocatalyst of a UV photocatalytic oxidation air purifier to extend a lifetime thereof. The overlayer 16 allows the air purifier to effectively purify air for a longer time period than without the overlayer before it deactivates.

While the instant disclosure has been described with reference to one or more exemplary embodiments, it will be understood by those skilled in the art that various changes may be made and equivalents may be substituted for elements thereof without departing from the scope thereof. In addition, many modifications may be made to adapt a particular situation or material to the teachings of the disclosure without departing from the scope thereof. Therefore, it is intended that the disclosure not be limited to the particular embodiment(s) disclosed as the best mode contemplated for carrying out this invention, but that the invention will include all embodiments falling within the scope of the appended claims.

What is claimed is:

1. A photocatalyst in a photocatalytic based air purification system for removing contaminants from a fluid, wherein said fluid has a first portion comprising a VSCC and a second portion comprising a VOC, said photocatalyst comprising:
    a photocatalyst layer on a substrate, wherein said photocatalyst layer is reactive with the contaminants when UV light is projected thereon; and
    a non-photocatalytic overlayer on said photocatalyst layer, said overlayer being UV transparent and having an interconnected pore network that allows the second portion to pass through said overlayer to said photocatalyst layer but at least retards the first portion from passing through said overlayer to said photocatalyst layer.

2. The photocatalyst of claim 1, wherein said overlayer has a surface area that is formed by a plurality of nanoparticulate agglomerates, and wherein said plurality of nanoparticulate agglomerates form a plurality of protrusions on a first surface of said overlayer that is opposite a second surface of said overlayer that is adjacent said photocatalyst layer.

3. The photocatalyst of claim 1, wherein said interconnected pore network is formed by a plurality of nanoparticulate agglomerates, and wherein said plurality of nanoparticulate agglomerates connect to one another forming spaces therebetween.

4. The photocatalyst of claim 1, wherein said interconnected pore network has a plurality of different sized pores that range between about 3 nanometers and about 200 nanometers.

5. The photocatalyst of claim 1, wherein said interconnected pore network has a first plurality of pores greater than about 3 nanometers, that connect with a second plurality of pores greater than 6 nanometers, that connect with a third plurality of pores greater than about 12 nanometers, that connect with a fourth plurality of pores greater than about 100 nanometers, that connect with a fifth plurality of pores less than about 200 nanometers.

6. The photocatalyst of claim 1, wherein said overlayer absorbs or backscatters less than about 25% of incident light.

7. The photocatalyst of claim 1, wherein said overlayer comprises $SiO_2$.

8. The photocatalyst of claim 1, wherein said overlayer is prepared from a slurry of fumed silica.

9. The photocatalyst of claim 1, wherein said interconnected pore network has pores of said overlayer that are sized smaller than a VSCC.

10. The photocatalyst of claim 1, wherein said substrate is a plate, mesh or honeycomb that comprises aluminum, ceramic, glass, fiberglass, quartz, carbon, activated carbon, or zeolite.

11. The photocatalyst of claim 1, wherein at least a portion of said photocatalyst layer at least retards the passage of the first portion and the second portion passes therethrough.

* * * * *